United States Patent

Sato et al.

[11] Patent Number: 5,570,766
[45] Date of Patent: Nov. 5, 1996

[54] END BEARING FOR ONE-WAY CLUTCH

[75] Inventors: Eichi Sato; Yoshihiro Kaku; Yuji Yokota; Hiroshi Shibata; Masanori Hatanaka; Eiji Sugiyama; Jun Sonoda, all of Toyota; Tetsuaki Numata, Nara-ken, all of Japan

[73] Assignees: Taiho Kogyo Co., Ltd., Aichi; Koyo Seiko Co., Ltd., Osaka, both of Japan

[21] Appl. No.: 403,469

[22] Filed: Mar. 14, 1995

[30] Foreign Application Priority Data

Mar. 18, 1994 [JP] Japan ..................................... 6-073958

[51] Int. Cl.⁶ .......................... F16D 41/06; F16C 33/12
[52] U.S. Cl. ..................... 192/45.1; 192/107 M; 384/276; 384/296
[58] Field of Search ................... 192/41 R, 45.1, 192/107.4; 384/276, 296, 912, 913

[56] References Cited

U.S. PATENT DOCUMENTS

| | | | |
|---|---|---|---|
| 2,648,580 | 8/1953 | Lignian | 384/295 |
| 2,757,055 | 7/1956 | Davis | 384/295 |
| 4,400,099 | 8/1983 | Ehrentraut | 384/283 |
| 4,561,787 | 12/1985 | Ehretraut et al. | 384/295 |
| 4,718,155 | 1/1988 | Warriner et al. | 384/283 X |
| 5,076,408 | 1/1991 | Numata et al. | 192/45.1 X |

*Primary Examiner*—Andrea L. Pitts
*Attorney, Agent, or Firm*—Flynn, Thiel, Boutell & Tanis, P.C.

[57] ABSTRACT

An end bearing for one-way clutch which is preferred for use in an automatic transmission is disclosed. The end bearing comprises a body formed of a steel plate, a hard coating applied to the surface of the body, and a soft coating applied to the surface of the hard coating. The steel plate of the body assures a sufficient rigidity. Regions of the end bearing which provide sliding surfaces are covered by a soft coating and a hard coating, which improves the anti-seizing resistance and the durability of the end bearing.

14 Claims, 8 Drawing Sheets

○ mark indicates good quality
× mark indicates bad quality
△ mark indicates poor quality

| | | sample materials | | | durability test 4000rpm×1000Hr |
|---|---|---|---|---|---|
| | material for and thickness of hard coating 9B(10B) | material for and thickness of first layer of soft coating 9C(10C) | heat treatment (heating temperature/period) | material for and thickness of second layer of soft coating | |
| embodiments of invention | 1 | Cu (7μm) | Sn (2μm) | — | | ○ |
| | 2 | Cu (30μm) | Sn (1μm) | — | | ○ |
| | 3 | Cu (7μm) | Sn (2μm) | 250°C 1 Hr | | ○ |
| | 4 | Cu (7μm) | Pb-Sn-Cu(20μm) | — | Sn (1μm) | ○ |
| | 5 | Cu (7μm) | Pb-Sn-Cu(30μm) | 170°C 1 Hr | Sn (1μm) | ○ |
| | 6 | Cu (7μm) | Pb-Sn-In(20μm) | — | | ○ |
| | 7 | Cu (7μm) | Pb-Sn (30μm) | — | Sn (1μm) | ○ |
| | 8 | Cu (7μm) | Pb-Sn-In(25μm) | 160°C 1 Hr | | ○ |
| | 9 | Ni-P (10μm) | Pb-Sn-Cu(20μm) | — | | ○ |
| | 10 | Ni-P (3μm) | Pb-Sn-In(20μm) | — | | ○ |
| | 11 | Ni-B (5μm) | Pb-Sn-In(20μm) | — | Sn (1μm) | ○ |
| | 12 | Ni (7μm) | Pb-Sn-Cu(20μm) | — | | ○ |
| | 13 | Al (10μm) | Pb-Sn-Cu(20μm) | — | Sn (1μm) | ○ |
| | 14 | Zn (10μm) | Pb-Sn-Cu(20μm) | — | — | ○ |
| conventional product | | phosphor bronze bimetal | — | — | △ (good durability but signs of seizure) |
| control 1 | | Ni-P plating | — | — | △ |
| control 2 | | manganese phosphate film | — | — | × (seizure occured) |
| control 3 | | Pb-Sn-Cu plating (30μm) | — | — | △ |

END BEARING FOR ONE-WAY CLUTCH

FIELD OF THE INVENTION

The invention relates to an end bearing for one-way clutch, and more particularly, to an end bearing for one-way clutch which is preferred for use in an automatic transmission, for example.

DESCRIPTION OF THE PRIOR ART

A one-way clutch is known in the art including an annular, inner race disposed radially inward, an annular, outer race which is disposed in surrounding relationship with the inner race, a plurality of sprags slidably interposed between the inner and the outer race, a retainer for retaining the sprags, a ribbon spring for urging the sprags against the orbital surfaces of the both races, and an annular end bearing slidably interposed between the circumferential surfaces of the both races at a location axially outside the retainer for supporting radial loads acting upon the both races.

An end bearing for one-way clutch is known in four forms in the art. In the first form, the end bearing is manufactured by a press molding of phosphor bronze plate. In the second form, an iron plate is integrally sintered with powder of phosphor bronze to provide a plate-shaped material which is shaped into an end bearing by a press molding. In the third form, an end bearing is manufactured by cutting high strength brass into shape. Lastly, in the fourth form, a steel is cut as desired, tempered and then annealed, followed by polishing. The surface of the polished steel is treated to apply a film of manganese phosphate.

However, end bearings manufactured in the prior art as mentioned above suffer from various disadvantages as pointed out below.

Specifically, an end bearing according to the first form exhibits a reduced rigidity, which causes an elastic deformation of a large magnitude to the end bearing as a radial load increases, which may result in a poor functioning of the entire one-way clutch or even a failure of the one-way clutch. An end bearing of the second form undergoes an elastic deformation of lesser magnitude as compared with the first form, but the iron plate is annealed in the sintering step during the manufacturing process, and this degrades the strength of the end bearing, disadvantageously causing a plastic deformation thereof. The third form results in a disadvantage that an increased material cost results in an increased cost of the overall one-way clutch. The fourth form assures a required rigidity, but suffers from a poor affinity and self-lubricating property of the manganese phosphate film formed on the surface. Accordingly, in order to secure a satisfactory anti-seizure resistance, a high dimensional accuracy is required during the manufacturing process, disadvantageously resulting in an increased cost of the overall one-way clutch.

The present applicant has previously proposed an improvement of an end bearing by applying Pb plating on the surface of a steel plate in Japanese Patent Application No. 212,989/1993, but a further improvement in the durability is required such as for use over a prolonged period of time or for use under harsh conditions of use.

SUMMARY OF THE INVENTION

Accordingly, the invention relates to a one-way clutch comprising an annular, inner race disposed radially inward, an annular, outer race disposed in surrounding relationship with the inner race, a plurality of sprags slidably interposed between the inner and the outer race, a retainer for retaining the sprags, a ribbon spring for urging the sprags against the orbital surfaces of the both races, and an annular end bearing slidably disposed between the circumferential surfaces of the both races at a location axially outside the retainer for supporting radial loads acting upon the both races.

In accordance with the invention, the end bearing comprises a body formed of an iron material including a tubular portion around the inner periphery, another tubular portion around the outer periphery and an annular portion connecting therebetween, a hard coating defined by a hard plating formed on the surface of the body, and a soft coating defined by a soft plating formed on the surface of the hard coating.

With this construction, the use of an iron material for the body assures a sufficient rigidity to withstand radial loads acting upon the end bearing. Since the surface of the end bearing which is disposed for sliding contact comprises a soft coating, the affinity is improved when the end bearing is in sliding contact with the inner and the outer race, thus providing an end bearing which exhibits improved anti-seizure resistance and durability.

Since the hard coating is interposed between the body and the soft coating, if the soft coating representing the surface which is disposed for sliding contact becomes abraded, such abrasion does not result in a sliding contact against the steel plate, which would degrade the sliding property, and the presence of the hard coating is effective to prevent the body from being abraded, thus improving the anti-seizure resistance. Depending on the combination of the hard and the soft coating, a diffusion reaction of the soft coating into the hard coating may proceed during use to improve the intimate adherence therebetween, thus further improving the sliding property of the hard coating. In this manner, there can be provided a one-way clutch which exhibits improved anti-seizure resistance and durability as compared with the prior art.

Above and other objects, features and advantages of the invention will become apparent from the following description of several embodiments thereof with reference to the attached drawings.

DETAILED DESCRIPTION OF EMBODIMENTS

Figure 1:
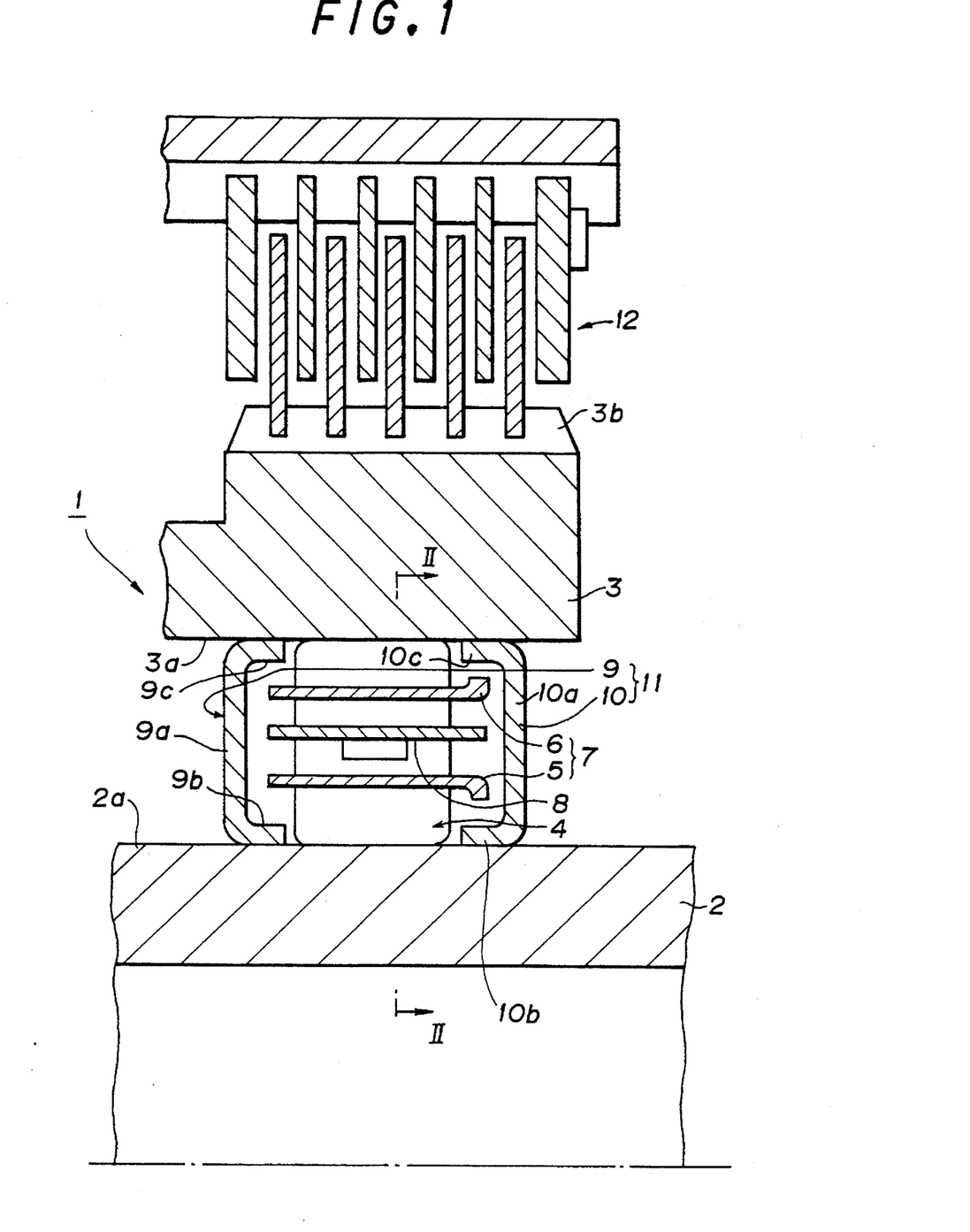
FIG. 1 is a cross section of a one-way clutch 1 according to one embodiment of the invention, showing only a portion thereof which is located upward of a centerline.

Referring to the drawings, several embodiments of the invention as shown will be described. FIG. 1 illustrates the section of essential parts of an automatic transmission used in an automobile. A one-way clutch 1 comprises an inner race 2 having an annular orbital surface 2a, an outer race 3 having an annular orbital surface 3a, a plurality of sprags 4 disposed between the both races 2, 3 for engaging the both orbital surfaces 2a, 3a to transmit a torque therebetween, a retainer 7 including a pair of inner and outer annular members 5, 6 for retaining the sprags 4 at positions which are spaced apart at an equal interval in the circumferential direction, a ribbon spring 8 disposed between the both annular members 5, 6 for imparting a momentum to the sprags 4 in a direction to engage or mesh with both orbital surfaces 2a, 3a, and an end bearing 11 including a pair of annular members 9, 10 disposed adjacent to the opposite axial ends of the retainer 7 and which is constructed in accordance with the invention. The inner race 2 is associated with a rotary shaft, not shown, for rotation therewith while the outer race 3 engages a friction plate 12, which is known in itself in the art, through a plurality of axial grooves 3b.

Figure 2:
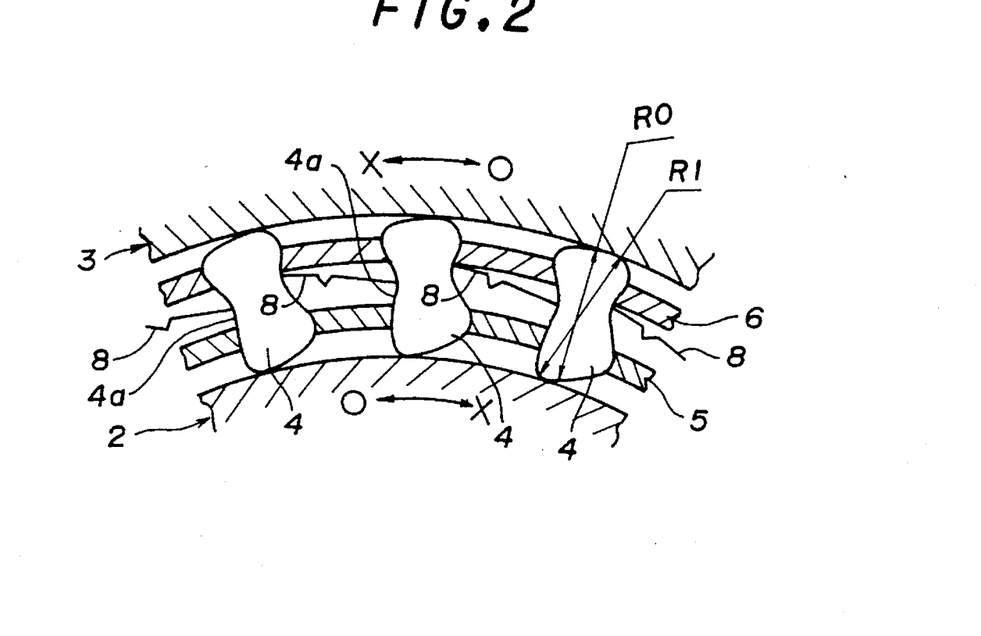
FIG. 2 is a cross section taken along the line II—II shown in FIG. 1.

As shown in FIG. 2, each sprag 4 has a dimension R1 which is chosen to be greater than another dimension R0. The ribbon spring 8 is disposed to extend between opposite recesses 4a of adjacent sprags 4, thus imparting a counter-clockwise momentum to each sprag 4, as viewed in FIG. 2. As a consequence, each sprag 4 cannot rotate counter-clockwise, as viewed in FIG. 2, but is slightly rotatable in a clockwise direction. Accordingly, when the inner race 2 tends to rotate counter-clockwise with respect to the outer race 3, the inner race 2 slides relative to the respective sprags 4 to be freely rotatable in the counter-clockwise direction, preventing a torque from being transmitted from the inner race 2 to the outer race 3. Conversely, when the inner race 2 tends to rotate clockwise relative to the outer race 3, the inner race 2 then engages or meshes with the respective sprags 4, whereby the respective sprags 4 simultaneously engage or mesh with the outer race 3, thus transmitting a torque from the inner race 2 to the outer race 3 to allow an integral rotation of the one-way clutch 1 in the clockwise direction.

The annular members 9, 10 which constitute the end bearing 11 include radially extending annular portions 9a, 10a, and tubular portions 9b, 10b and 9c, 10c which extend axially around the inner periphery and the outer periphery of the annular portions 9a, 10a, respectively. Thus, the annular members 9, 10 are channel-shaped in section. The axially left end of the retainer 7 is positioned between the tubular portions 9b, 9c of the left-hand annular member 9 which extend around the inner and the outer periphery while the axially right end of the retainer 7 is positioned between the tubular portions 10b, 10c of the right-hand annular member 10 which extend around the inner and the outer periphery. The inner peripheral surfaces of the tubular portions 9b, 10b of the both annular members 9, 10 are disposed in sliding contact with the outer peripheral surface of the inner race 2 while the outer peripheral surfaces of the tubular members 9c, 10c of the both annular members 9, 10 are disposed in sliding contact with the inner peripheral surface of the outer race 3. By using the end bearing 11 which is disposed in this manner, the both races 2, 3 can be disposed so that their axes are in alignment and so that the both races 4, 5 can be radially supported.

Figure 3:
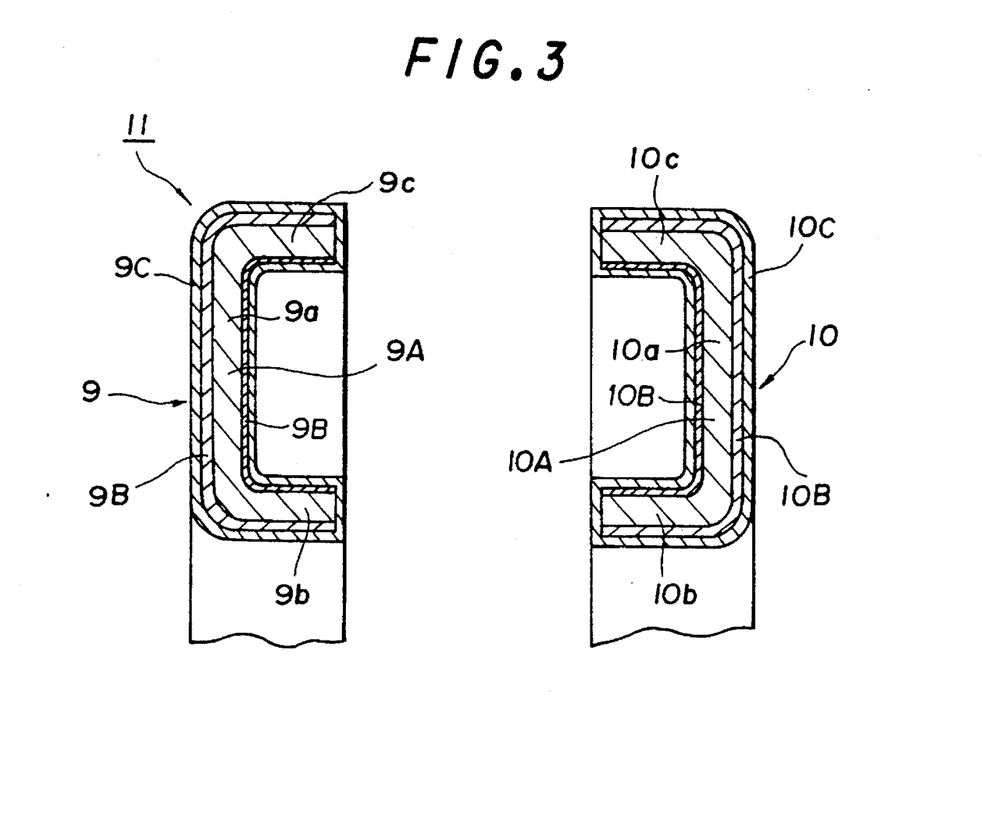
FIG. 3 is a cross section, to an enlarged scale, of an essential part shown in FIG. 1.
Figure 4:
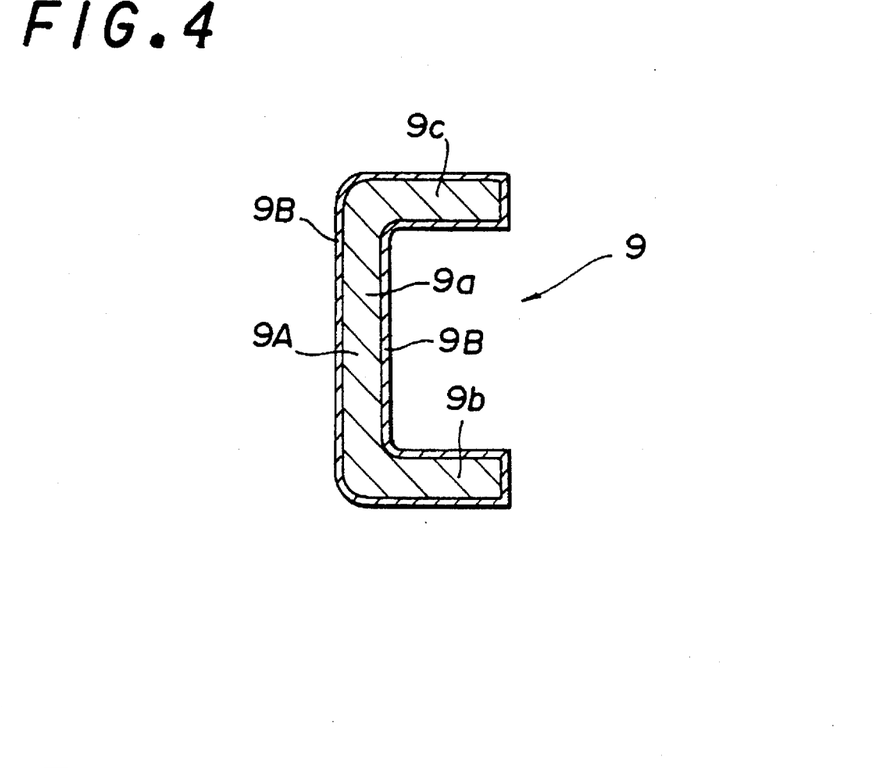
FIG. 4 is a cross section showing a hard coating according to another embodiment of the invention.

FIG. 3 shows the end bearing 11 of the embodiment to an enlarged scale, which is constructed in a manner to be described below so as to improve the bearing performance. Specifically, the respective annular members 9, 10 comprise annular bodies 9A, 10A which are channel-shaped in section, hard coatings 9B, 10B defined by a hard plating formed on the entire surface of the bodies 9A, 10A, respectively, except for the end faces of the tubular portions 9b, 10b and 9c, 10c, which extend around the inner and the outer periphery, and soft coatings 9C, 10C defined by a soft plating formed on the entire surface including the surfaces of the hard coatings 9B, 10B as well as the end faces mentioned above.

A process of manufacturing the end bearing 11 of the embodiment will now be described. Initially, a steel plate having a thickness of 1 mm and a hardness of Hv 100 to 180 and which is plated with copper (Cu) to a thickness of 8 µm on the front surface and to a thickness of 1 µm on the rear surface is prepared. The steel plate is stamped into a channel configuration by a press operation so that the copper plating having a thickness of 8 µm defines the outer surface. This forms the bodies 9A, 10A, which each comprise a steel plate, as well as the hard coatings 9B, 10B, which each comprise a copper plating, are simultaneously formed in one step.

The "outer surface" of the end bearing 11 as referred to herein generically include the sliding surface (the inner peripheral surface) of the tubular portions 9b, 10b extending around the inner periphery, the sliding surface (the outer peripheral surface) of the tubular portions 9c, 10c extending around the outer periphery as well as one of the surfaces of the annular portions 9a, 10a which connect between these tubular portions. Similarly, the "inner surface" of the end bearing 11 generically refers to the outer peripheral surface of the tubular portions 9b, 10b, the inner peripheral surface of the tubular portions 9c, 10c as well as the other surface of the annular portions 9a, 10a which connect therebetween.

Subsequently, a tin (Sn) plating is applied to the entire exposed surface to a thickness of 2 µm, thus providing the soft coatings 9C, 10C of the end bearing 11 according to this embodiment.

After the soft coatings 9C, 10C have been formed, the end bearing 11 may be subjected to a heat treatment at a temperature from 160° to 250° C. for an interval on the order of one hour. Such heat treatment is effective to promote the interdiffusion of metals which form the hard coatings 9B, 10B and the soft coatings 9C, 10C. Thus the tin (Sn) diffuse into the copper (Cu) of the hard coatings 9B, 10B to provide Cu-Sn layer, improving the sliding characteristic of the hard coatings 9B, 10B. During the operation, the temperature of the end bearing 11 rises to the order of 120° C., and accordingly, since such reaction proceeds during the operation, it is not essential that the heat treatment mentioned above be performed during the manufacturing process.

In the described embodiment, the bodies 9A, 10A and hard coatings 9B, 10B are simultaneously formed by a press stamping operation by providing a steel plate which is previously applied with a copper plating on its front and rear surface (the bodies 9A, 10A may also be constructed of iron). This advantageously improves the dimensional accuracy. However, a steel plate which is not provided with a copper plating on either front or rear surface may be provided, and may be press formed into channel configuration in section to define the bodies 9A, 10A initially, followed by applying a copper plating to the outer surfaces of the bodies 9A, 10A alone, thus forming the hard coatings 9B, 10B. Obviously, the copper plating may be applied to the entire exposed surface of the bodies 9A, 10A. Instead of the press operation, the steel plate may be machined, by cutting, to form the bodies 9A, 10A into shape.

Instead of Cu mentioned above, Ni, Ni-P, Ni-B, Al or Zn may be used as a material to form the hard coatings 9B, 10B. The thickness of the hard coatings 9B, 10B may be on the order of from 0.5 μm to 50 μm, and more preferably, from 1 μm to 30 μm.

Instead of Sn mentioned above, Pb—Sn or Pb—Sn—Cu or Pb—Sn—In may be used as a material to form the soft coatings 9C, 10C. Alternatively, Sn alloy may be used. The thickness of the soft coatings 9C, 10C may be on the order of from 0.2 μm to 50 μm, or more preferably, from 0.5 μm to 30 μm.

FIGS. 4 to 7 show other embodiments which represent modifications relating to the construction of the hard coating 9B (10B). In the embodiment shown in FIG. 3, the hard coatings 9B, 10B have not been formed on the end faces of the tubular portion 9c (10c) extending around the outer periphery and the tubular portion 9b (10b) extending around the inner periphery, but in the embodiment shown in FIG. 4, the hard coating 9B also covers such end faces. Thus, the hard coating 9B is applied over the entire exposed surface of the body 9A.

Figure 5:
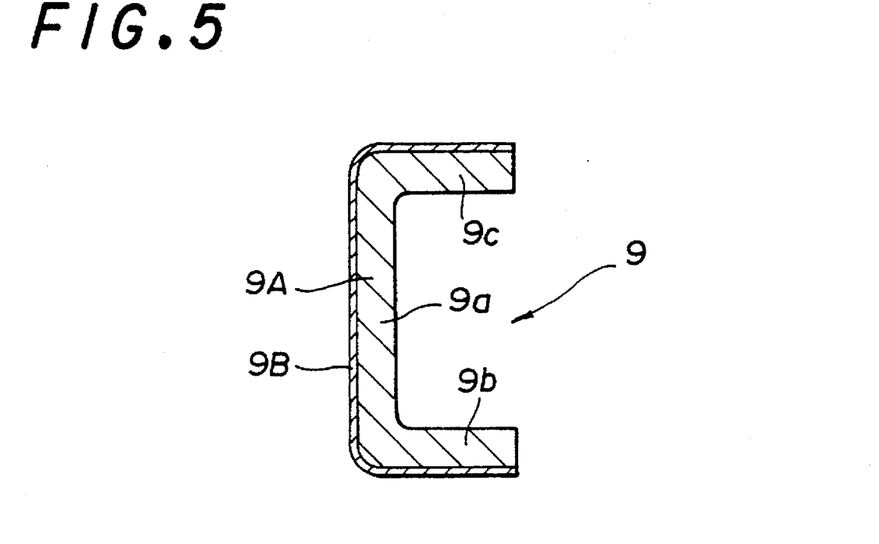
FIG. 5 is a cross section of a hard coating according to a further embodiment of the invention.

In FIG. 5, the hard coating 9B is applied only over the outer surface of the body 9A.

Figure 6:
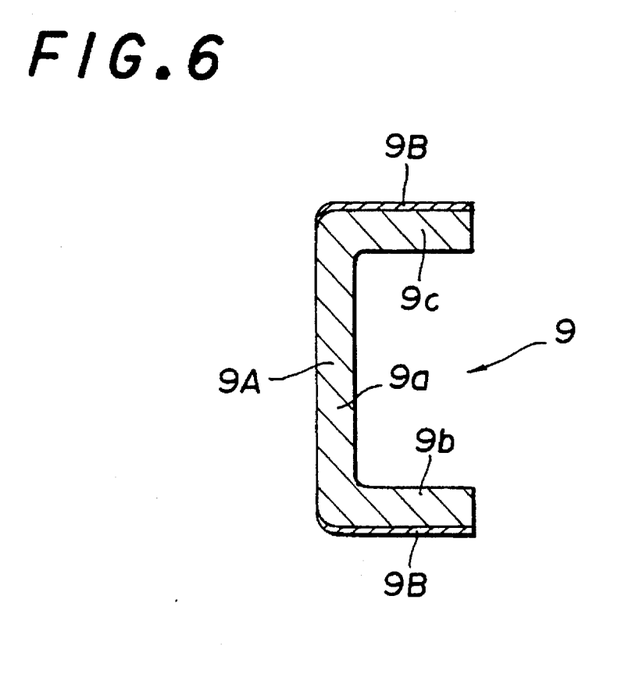
FIG. 6 is a cross section of a hard coating according to still another embodiment of the invention.

In FIG. 6, the hard coating 9B is applied only over the sliding surfaces of the tubular portions 9c and 9b which extend around the outer and the inner periphery of the body 9A.

Figure 7:
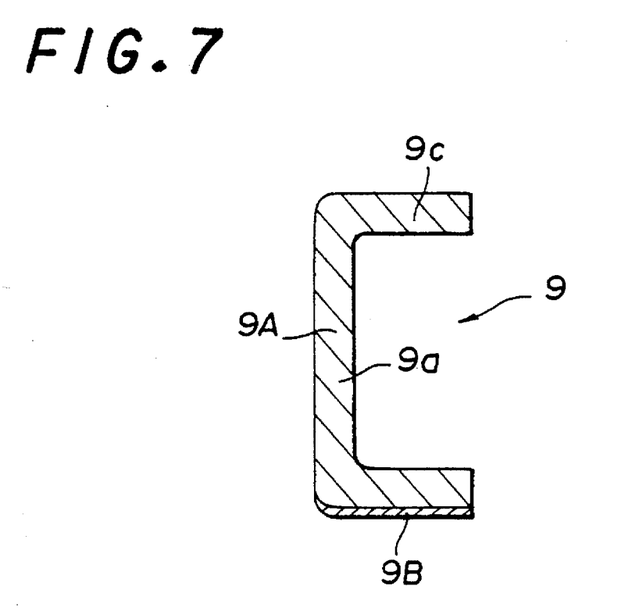
FIG. 7 is a cross section of a hard coating according to a still further embodiment of the invention.

In FIG. 7, the hard coating 9B is applied only over the sliding surface of the tubular portion 9b which extends around the inner periphery of the body 9A.

While not shown in FIGS. 4 to 7, it should be understood that the soft coating 9C is formed over the entire surface of the annular member 9 in each instance.

Figure 8:
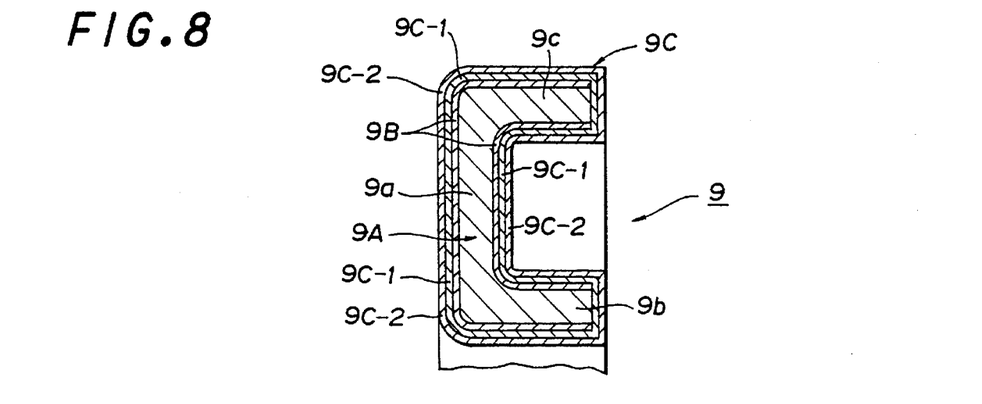
FIG. 8 is a cross section of another embodiment of the invention.
Figure 9:
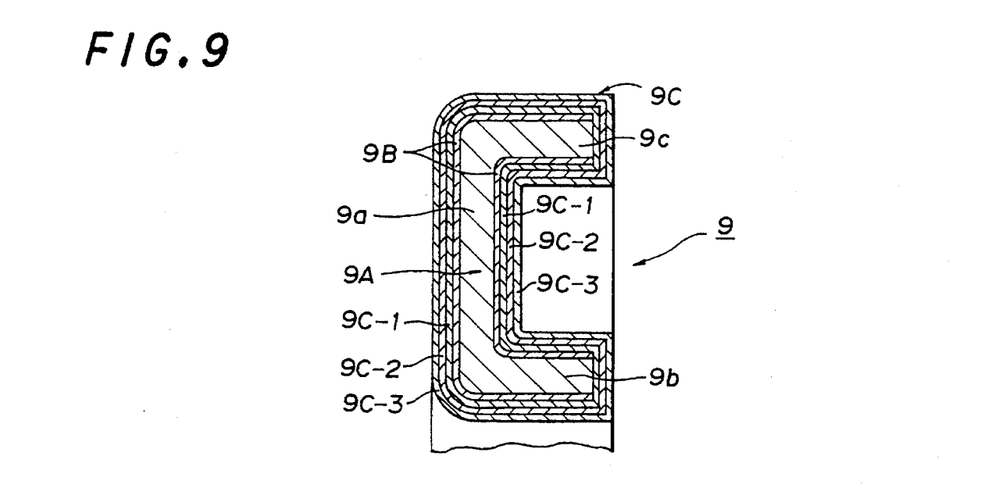
FIG. 9 is a cross section of a further embodiment of the invention.
Figure 10:
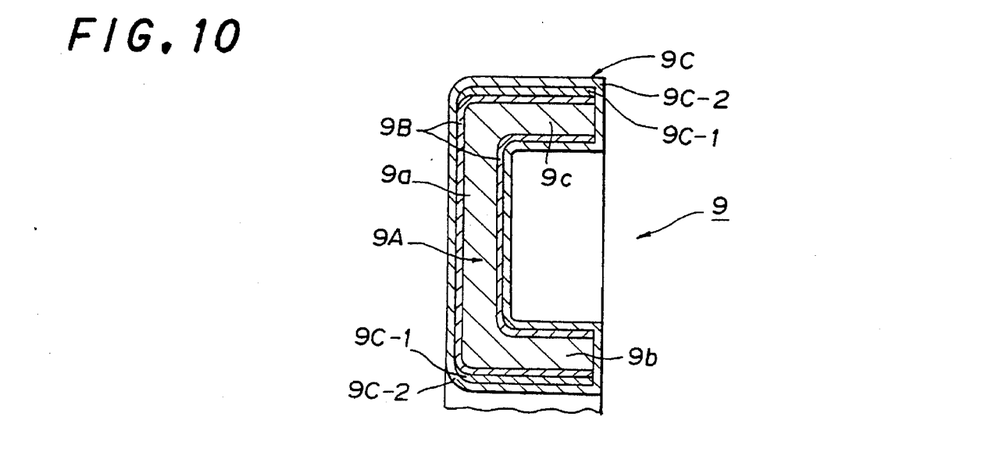
FIG. 10 is a cross section of still another embodiment of the invention.

FIGS. 8 to 10 show additional embodiments which also represent modifications relating to the construction of the soft coating 9C (10C). While the soft coating 9C (10C) shown in FIG. 3 comprises a single plated layer, in the embodiments shown in FIGS. 8 to 10, each of the soft coatings 9C comprises a plurality of plated layers.

Specifically, in the embodiment shown in FIG. 8, the soft coating 9C comprises two plated layers which are sequentially plated over the entire surface. More specifically, a first plated layer 9C-1 which forms the inner layer for the soft coating 9C comprises Pb alloy while a second plated layer 9C-2 which represents the outer layer comprises Sn plating or Sn alloy plating. The term "Pb alloy" is meant to include Pb—Sn, Pb—Sn—Cu, or Pb—Sn—In, for example, and not exclusive of Pb alloy having a different combination.

In the embodiment shown in FIG. 9, the soft coating 9C comprises three layers which are sequentially plated over the entire surface. Specifically, a first plated layer 9C-1 and an intermediate or a second plated layer 9C-2, which are innermost for the soft coating 9C, comprise Pb alloy while a third plated layer 9C-3 which is outermost comprises Sn plating or Sn alloy plating. More specifically, the first plated layer 9C-1 comprises Pb—Sn—Cu, and the second or intermediate plated layer 9C-2 comprises Pb—Sn—In. The choice of Pb—Sn—Cu for the first layer is because it exhibits a higher hardness than the material Pb—Sn—In in the second layer. Obviously, the first and the second layer may be interchanged without causing any problem.

In the embodiment shown in FIG. 10, the soft coating 9C comprises two plated layers only in a region which represents either inner or outer sliding surface. Thus, when manufacturing the annular member 9 shown in FIG. 10, after the hard coating 9B is applied over the body 9A, the areas of the hard coating 9B which represents the inner and the outer sliding surfaces are applied with a Pb alloy plating, specifically, one of Pb—Sn, Pb—Sn—Cu or Pb—Sn—In platings, thus forming the inner or first plated layer 9C-1. Subsequently, Sn or Sn alloy plating is applied to the entire exposed surface to form the outer or second plated layer 9C-2.

It should be understood that while the embodiments shown in FIGS. 8 to 10 indicate the application of the soft coating 9C over the hard coating 9B constructed in the manner illustrated in FIG. 3, such soft coating 9C may be applied to any of the hard coating 9B shown in FIGS. 4 to 7.

Also it should be understood that a combination of materials which are used to form the hard coatings 9B, 10B and the soft coatings 9C, 10C are not limited to the examples given above, but may be chosen as desired.

Figure 11:
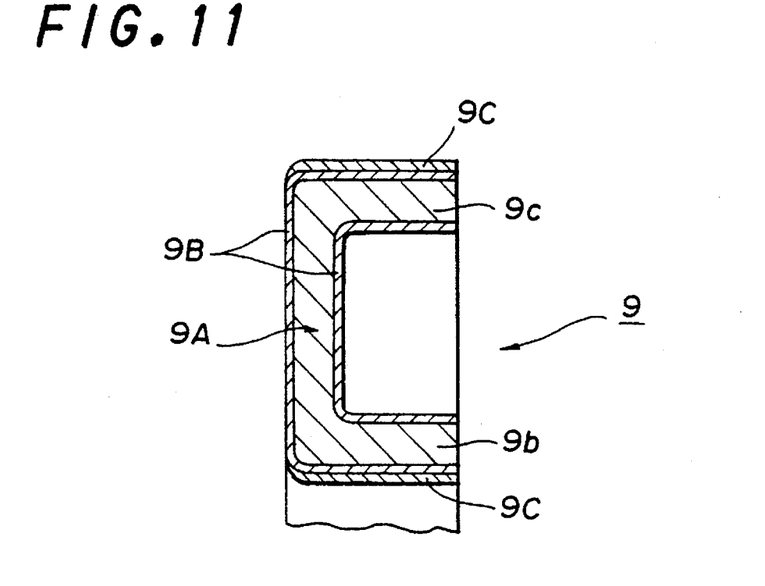
FIG. 11 is a cross section of a still further embodiment of the invention.
Figure 12:
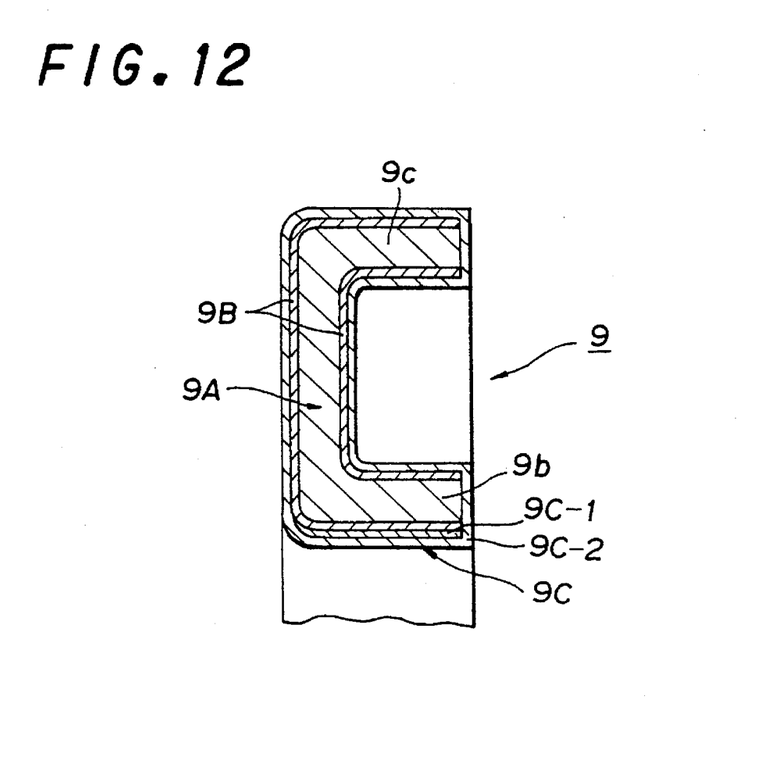
FIG. 12 is a cross section of yet another embodiment of the invention.

FIGS. 11 and 12 show additional embodiments of the invention. The embodiment shown in FIG. 11 represents an omission of the outer plated layer 9C-2 from the embodiment shown in FIG. 10. Accordingly, in this embodiment, the soft coating 9C is formed only in the region of the inner and the outer sliding surface.

The embodiment shown in FIG. 12 represents an omission of the soft coating 9C for the outer sliding surface from the embodiment shown in FIG. 11, thus leaving only the first plated layer 9C-1 over the inner sliding surface, and subsequently the second plated layer 9C-2 is applied over the entire exposed surface in the same manner as shown in FIG. 10. Accordingly, in this embodiment, only the soft coating 9C for the inner sliding surface comprises two plated layers.

It should be noted that although only the left-hand annular member 9 which constitutes the end bearing 11 has been shown in section for brevity of description in FIGS. 4 to 12, the right-hand annular member 10, as viewed in cross section, are similarly constructed as the left-hand annular member 9.

In addition, any combination of various embodiments may be used for the end bearings of the both sides, or alternatively, the construction according to the invention may be employed for the end bearing of one side only.

Figure 14:
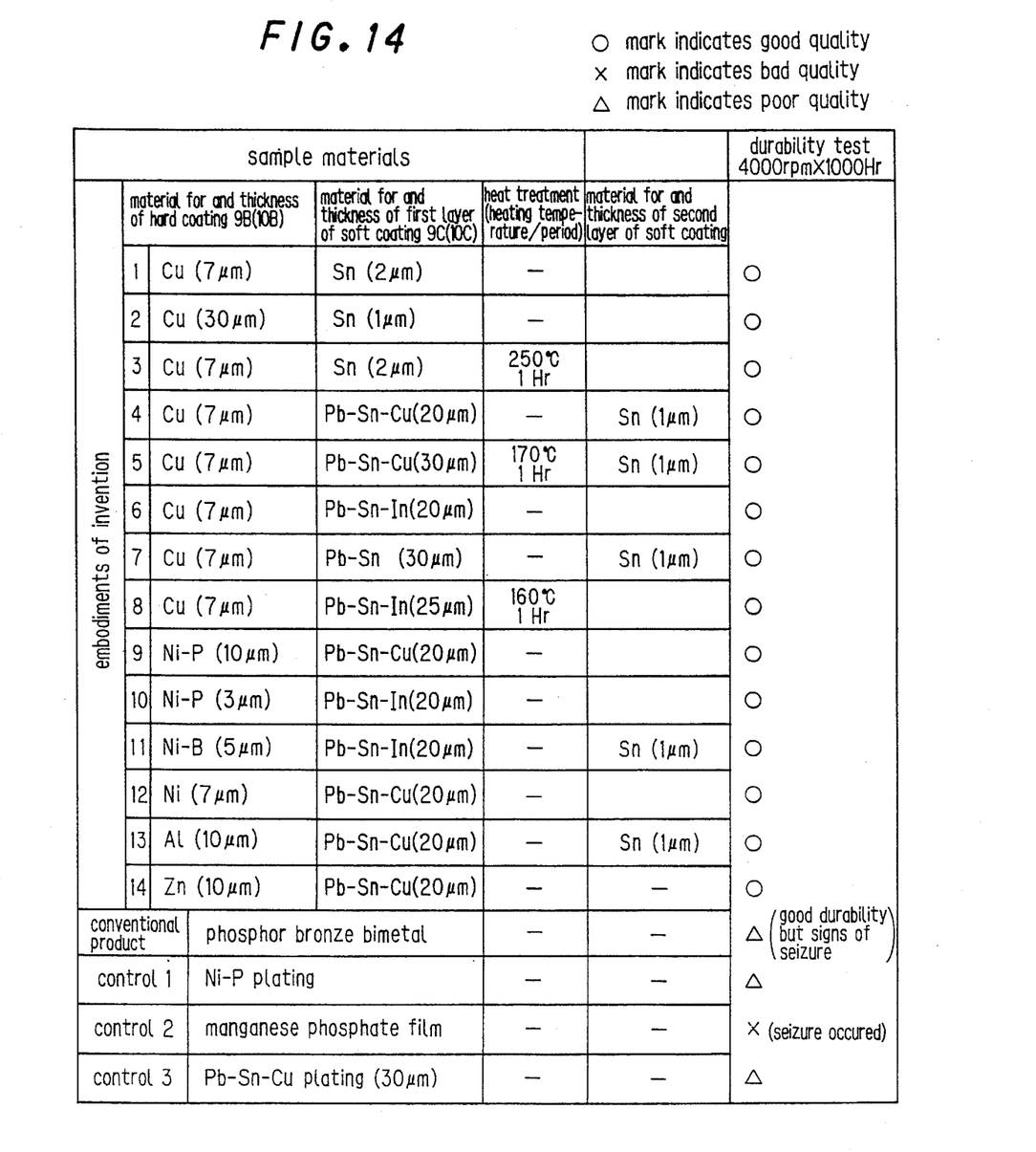
FIG. 14 is a chart indicating results of the durability test.

A chart shown in FIG. 14 indicates results of a durability test conducted upon end bearings 11 according to various embodiments of the invention and an end bearing known in the art and other controls.

Figure 13:
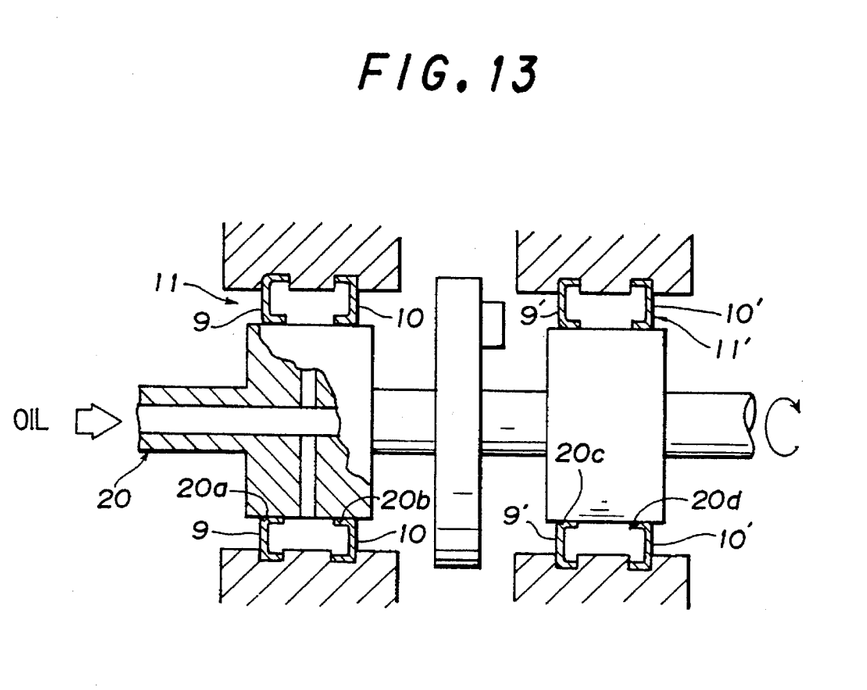
FIG. 13 is a cross section illustrating essential parts which indicate parameters used during a durability test.

The test took place using a rotary load bush journal testing machine and employing an arrangement as shown in FIG. 13 where two end bearings 11, 11' each comprising a pair of annular members 9, 10 or 9', 10', are disposed in axial alignment, and the tubular portions extending around the outer periphery of the respective end bearings 11, 11' are secured while the tubular portions extending around the inner periphery of the end bearings are disposed in sliding contact with a rotary shaft 20 for purpose of testing. A lubricating oil at an oil temperature of 100° C. is supplied at a rate of two liters per minute to each of areas of sliding contact 20a, 20b, 20c, 20d between the end bearings 11, 11' and the rotary shaft 20. When the rotary shaft 20 revolves at 4,000 rpm, a rotating load of about 3 kgf is applied to each end bearing 11, 11'.

A conventional end bearing which is listed on the chart of FIG. 14 is manufactured by uniformly spreading alloy of phosphor bronze on an iron plate and sintering the assembly at about 860° C., followed by a press molding operation. The conventional end bearing exhibits a good durability, but indicated signs of seizure.

Control 1 includes Ni—P plating as a hard surface treatment applied to a body which is similar to that used in the embodiments of the invention, but exhibited a poor durability.

Control 2 includes manganese phosphate film coated on the surface of a body which is formed in the same manner as in the present application, but suffered from the occurrence of a seizure.

Control 3 includes Pb—Sn—Cu plating, 30 μm thick, applied to the surface of a body similar to that used in the present invention, but exhibited a poor durability.

Experimental results appearing in the chart shown in FIG. 14 indicate that the product according to the invention exhibits an excellent durability as compared with such conventional product and controls 1, 2 and 3.

As mentioned above, the end bearing 11 according to the invention includes bodies 9A, 10A which are constructed by steel plate, and this assures a sufficient rigidity to withstand radial loading.

Since the end bearing 11 has a sliding surface which comprises either soft coating 9C, 10C, the affinity of the end bearing 11 as it slides against the orbital surfaces 2a, 3a of the inner race 2 and the outer race 3 is excellent, improving the anti-seizure resistance and the durability.

The presence of the hard coatings 9B, 10B between the bodies 9A, 10A, and the soft coatings 9C, 10C is capable of preventing the bodies 9A, 10A from becoming abraded by the hard coatings 9B, 10B, if the soft coatings 9C, 10C, which represent the sliding surfaces, are abraded, thus improving the anti-seizure resistance.

It will be appreciated from the experimental results shown in FIG. 14 that a one-way clutch 1 having an excellent anti-seizure resistance and durability which are improved over the prior art is provided in accordance with the invention.

While the invention has been described above in connection with several embodiments thereof, it should be understood that a number of changes, modifications and substitutions therein will readily occur to one skilled in the art from the above disclosure without departing from the spirit and scope of the invention defined by the appended claims.

What is claimed is:

1. In an one-way clutch including an annular inner race which is disposed radially inward, an annular outer race which is disposed in surrounding relationship with the inner race, a plurality of sprags slidably interposed between the inner and the outer race, a retainer for retaining the sprags, a ribbon spring for urging the sprags against orbital surfaces of both the races, and an annular end bearing slidably interposed between peripheral surfaces of both the races at a location axially outside the retainer for supporting radial loads acting outside the retainer for supporting radial loads acting upon both the races;

an end bearing for the one-way clutch comprising a body formed of a metal and including a tubular portion extending around an inner periphery thereof, another tubular portion extending around an outer periphery thereof and an annular portion providing a connection between both the tubular portions, a relatively hard coating defined by a relatively hard plating formed on a surface of the body except for the end faces of the tubular portions extending around the inner and the outer periphery, and a relatively soft coating defined by a relatively soft plating formed on a surface of said relatively hard coating.

2. An end bearing according to claim 1 in which the hard coating has a thickness which is from 0.5 to 50 μm.

3. An end bearing according to claim 1 in which the soft coating has a thickness of from 0.2 to 50 μm.

4. In an one-way clutch including an annular inner race which is disposed radially inward, an annular outer race which is disposed in surrounding relationship with the inner race, a plurality of sprags slidably interposed between the inner and the outer race, a retainer for retaining the sprags, a ribbon spring for urging the sprags against orbital surfaces of both the races, and an annular end bearing slidably interposed between peripheral surfaces of both the races at a location axially outside the retainer for supporting radial loads acting outside the retainer for supporting radial loads acting upon both the races;

an end bearing for the one-way clutch comprising a body formed of a metal and including a tubular portion extending around an inner periphery thereof, another tubular portion extending around an outer periphery thereof and an annular portion providing a connection between both the tubular portions, a relatively hard coating defined by a relatively hard plating formed only on the outer surface of the body, and a relatively soft coating defined by a relatively soft plating formed on a surface of the hard coating.

5. An end bearing according to claim 4 in which the hard coating has a thickness which is from 0.5 to 50 μm.

6. An end bearing according to claim 4 in which the soft coating has a thickness of from 0.2 to 50 μm.

7. In an one-way clutch including an annular inner race which is disposed radially inward, an annular outer race which is disposed in surrounding relationship with the inner race, a plurality of sprags slidably interposed between the inner and the outer race, a retainer for retaining the sprags, a ribbon spring for urging the sprags against orbital surfaces of both the races, and an annular end bearing slidably interposed between peripheral surfaces of both the races at a location axially outside the retainer for supporting radial loads acting outside the retainer for supporting radial loads acting upon both the races;

an end bearing for the one-way clutch comprising a body formed of a metal and including a tubular portion extending around an inner periphery thereof, another tubular portion extending around an outer periphery thereof, and an annular portion providing a connection between both the tubular portions, a relatively hard coating defined by a relatively hard plating formed on a surface of the body, and a relatively soft coating defined by a relatively soft plating formed on a surface of the hard coating in which the soft coating comprises a double plated layer which is sequentially plated over the entire surface of the body, a first plated layer of the double layer comprising Pb alloy and a second plated layer of the double layer comprising Sn or Sn alloy.

8. An end bearing according to claim 7 in which the soft coating has a thickness of from 0.2 to 50 μm.

9. In an one-way clutch including an annular, inner race which is disposed radially inward, an annular, outer race which is disposed in surrounding relationship with the inner race, a plurality of sprags slidably interposed between the inner and the outer race, a retainer for retaining the sprags, a ribbon spring for urging the sprags against orbital surfaces of both the races, and an annular end bearing slidably interposed between peripheral surfaces of both the races at a location axially outside the retainer for supporting radial loads acting outside the retainer for supporting radial loads acting upon both the races;

an end bearing for one-way clutch comprising a body formed of a metal and including a tubular portion extending around an inner periphery thereof, another tubular portion extending around an outer periphery thereof and an annular portion providing a connection between both the tubular portions, a relatively hard coating defined by a relatively hard plating formed on a surface of the body, and a relatively soft coating defined by a relatively soft plating formed on a surface of the hard coating in which the soft coating comprises three plated layers which are sequentially plated over the entire surface of the body, a first and a second plated layer each comprising Pb alloy and a third layer comprising Sn or Sn alloy.

10. An end bearing according to claim 9 in which the soft coating has a thickness of from 0.2 to 50 µm.

11. In an one-way clutch including an annular inner race which is disposed radially inward, an annular outer race which is disposed in surrounding relationship with the inner race, a plurality of sprags slidably interposed between the inner and the outer race, a retainer for retaining the sprags, a ribbon spring for urging the sprags against orbital surfaces of both the races, and an annular end bearing slidably interposed between peripheral surfaces of both the races at a location axially outside the retainer for supporting radial loads acting outside the retainer for supporting radial loads acting upon both the races;

an end bearing for the one-way clutch comprising a body formed of a metal and including a tubular portion extending around an inner periphery thereof and slidably supporting the inner race on an inner sliding surface thereon, another tubular portion extending around an outer periphery thereof and slidingly supporting the outer race surface thereon, and an annular portion providing a connection between both the tubular portions, a relatively hard coating defined by a relatively hard plating formed on a surface of the body, and a relatively soft coating defined by a relatively soft plating formed on a surface of the hard coating in which the soft coating comprises a double plated layer, a first layer of the double plated layer comprising Pb alloy and formed on the inner and the outer sliding surfaces, a second layer of the double plated layer comprising Sn or Sn alloy and being formed over the entire surface of the body inclusive of the first layer.

12. An end bearing according to claim 11 in which the soft coating has a thickness of from 0.2 to 50 µm.

13. In an one-way clutch including an annular inner race which is disposed radially inward, an annular outer race which is disposed in surrounding relationship with the inner race, a plurality of sprags slidably interposed between the inner and the outer race, a retainer for retaining the sprags, a ribbon spring for urging the sprags against orbital surfaces of both the races, and an annular end bearing slidably interposed between peripheral surfaces of both the races at a location axially outside the retainer for supporting radial loads acting outside the retainer for supporting radial loads acting upon both the races;

an end bearing for one-way clutch comprising a body formed of a metal and including a tubular portion extending around an inner periphery thereof and slidably supporting the inner race on an inner sliding surface thereon, another tubular portion extending around an outer periphery thereof and an annular portion providing a connection between both the tubular portions, a relatively hard coating defined by a relatively hard plating formed on a surface of the body, and a relatively soft coating defined by a relatively soft plating formed on a surface of the hard coating in which the soft coating comprises a double plated layer, a first layer of the double plated layer comprising Pb alloy and being formed only on the inner sliding surface, a second layer of the double plated layer comprising Sn or Sn alloy and being formed over the entire surface of the body inclusive of the first layer.

14. An end bearing according to claim 13 in which the soft coating has a thickness of from 0.2 to 50 µm.

* * * * *

UNITED STATES PATENT AND TRADEMARK OFFICE
CERTIFICATE OF CORRECTION

PATENT NO. : 5,570,766
DATED : Nov. 5, 1996
INVENTOR(S) : Eichi Sato, et al.

It is certified that error appears in the above-identified patent and that said Letters Patent is hereby corrected as shown below:

```
Column 7, lines 66 and 67; delete "outside the retainer for supporting
                                   radial loads acting".

Column 8, lines 25 and 26; delete "outside the retainer for supporting
                                   radial loads acting".

lines 50 and 51; delete "outside the retainer for supporting
                                   radial loads acting".

Column 9, lines 10 and 11; delete "outside the retainer for supporting
                                   radial loads acting".

lines 37 and 38; delete "outside the retainer for supporting
                                   radial loads acting".

Column 10, lines 23 and 24; delete "outside the retainer for supporting
                                    radial loads acting".
```

Signed and Sealed this

Twenty-fourth Day of April, 2001

*Attest:*

NICHOLAS P. GODICI

*Attesting Officer*     *Acting Director of the United States Patent and Trademark Office*